(12) United States Patent
Kilani

(10) Patent No.: US 6,976,044 B1
(45) Date of Patent: Dec. 13, 2005

(54) NARROWBAND INTERFERENCE CANCELLER FOR WIDEBAND COMMUNICATION SYSTEMS

(75) Inventor: Mehdl Tavassoli Kilani, Mississauga (CA)

(73) Assignee: Maxim Integrated Products, Inc., Sunnyvale, CA (US)

( * ) Notice: Subject to any disclaimer, the term of this patent is extended or adjusted under 35 U.S.C. 154(b) by 642 days.

(21) Appl. No.: 09/944,559

(22) Filed: Aug. 31, 2001

Related U.S. Application Data

(60) Provisional application No. 60/290,378, filed on May 11, 2001.

(51) Int. Cl.[7] .............................................. G06F 17/10
(52) U.S. Cl. ...................... 708/320; 708/322
(58) Field of Search ................ 708/319, 320, 708/322, 323

(56) References Cited

U.S. PATENT DOCUMENTS

| | | | | |
|---|---|---|---|---|
| 5,768,166 A | * | 6/1998 | Palatnik ..................... | 708/322 |
| 5,960,091 A | * | 9/1999 | White et al. .................. | 381/98 |
| 6,160,588 A | * | 12/2000 | Ma et al. ..................... | 348/491 |
| 6,683,913 B1 | * | 1/2004 | Kantschuk .................. | 375/258 |

FOREIGN PATENT DOCUMENTS

EP 913951 A2 * 5/1999

* cited by examiner

*Primary Examiner*—Chuong D Ngo
(74) *Attorney, Agent, or Firm*—Blakely, Sokoloff, Taylor & Zafman LLP

(57) ABSTRACT

A method and apparatus for adaptively removing interference from a signal. In one embodiment, the invention comprises an infinite impulse response (IIR) notch filter configured to receive a wideband signal and provide a filtered output signal, and a controller coupled to the notch filter to adaptively control the null frequency of the notch filter thereby removing narrowband interference from the received wideband signal. The controller may employ a gradient-based algorithm to detect the highest power frequency band in the output signal and modify the null frequency of the notch filter to minimize the power of the output signal.

56 Claims, 3 Drawing Sheets

NARROWBAND INTERFERENCE CANCELLER FOR WIDEBAND COMMUNICATION SYSTEMS

CROSS REFERENCE TO RELATED APPLICATIONS

This non-provisional United States (U.S.) patent application claims the benefit of U.S. Provisional Application No. 60/290,378, filed by inventor Mehdi T. Kilani on May 11, 2001, titled "Narrowband Interference Canceller For Wideband Communication Systems".

FIELD

This invention relates generally to communication methods, systems, and devices. More particularly, the invention relates to a filter for adaptively canceling interference in communication systems.

BACKGROUND

Receiving devices or systems in a communication system may receive signals or waveforms which are distorted by interference or noise. Some of the signal distortion may be caused by narrowband interference. Narrowband interference may be interfering noise or signals which are centered about particular frequencies.

Despite such interference, a receiving device must be able to detect a signal and determine its content. For example, the performance of spread spectrum communication systems such as Code Division Multiple Access (CDMA) and Orthogonal Frequency Division Multiplexing (OFDM) signals are severely degraded in the presence of strong sinusoidal interference.

Receiving devices use various methods, schemes, and/or systems to remove such interference. One such method employs filters, such as a notch filter, to filter out interference from a received signal.

Notch filters remove signal energy contained in a narrow band of frequencies. A fixed frequency notch filter removes a particular narrow band of frequencies. The narrow band of frequencies removed is determined by the value of the circuit elements employed in the filter.

However, in many applications, the particular frequency of the interference is unknown and, consequently, a fixed frequency notch filter is ineffective. Therefore, a filter which adapts itself to filter out interference of unknown or varying frequency is sought.

DETAILED DESCRIPTION

In the following detailed description of the invention, numerous specific details are set forth in order to provide a thorough understanding of the invention. However, it will be obvious to one skilled in the art that the invention may be practiced without these specific details. In other instances well known methods, algorithms, procedures, components, and circuits have not been described in detail so as not to unnecessarily obscure aspects of the invention.

One aspect of the invention provides an adaptive notch filter to filter out interference in a signal. An adaptive structure is provided for eliminating a narrowband interference signal from the received signal prior to detection, thus improving the performance of the communication system significantly. The adaptive notch filter employs its output signal to generate a feedback error signal which serves to center the null frequency (filtered frequency band) of the notch filter on the narrowband interfering frequency.

Another aspect of the invention provides a novel notch filter structure with parameters that serve as absorbing scaling factors to reduce the dynamic range of the signals at the various nodes of the notch filter and provide stability to the filter.

An adaptive notch filter has an electrical control input to vary the null or center frequency (the narrow band of frequencies to be removed) of the notch filter.

According to one implementation, the invention utilizes a constrained Infinite Impulse Response (IIR) notch filter together with an adaptation algorithm in a novel structure. The adaptation algorithm may be a recursive algorithm for updating the time varying coefficient(s) of the notch filter.

Figure 1:
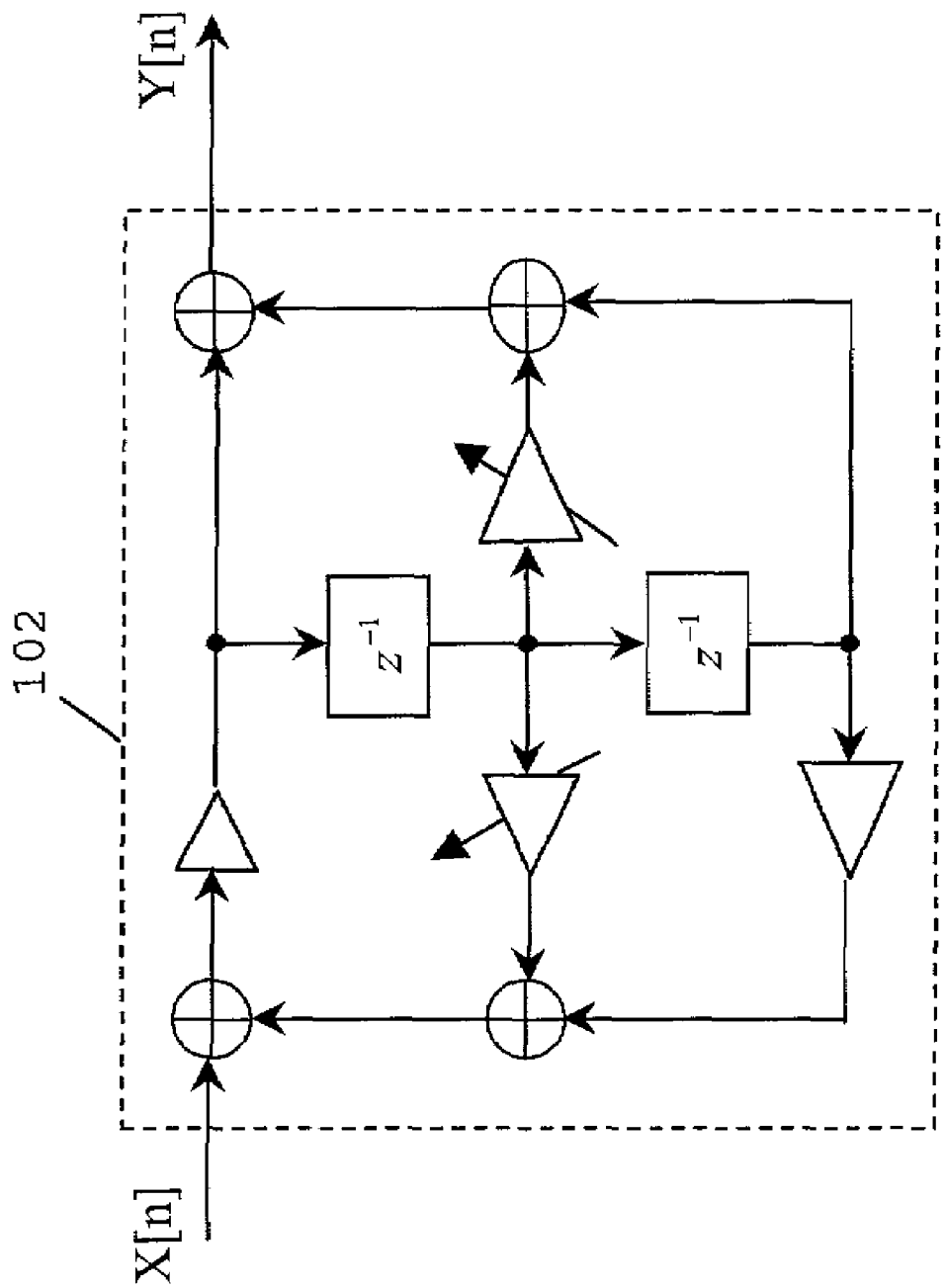
FIG. 1 illustrates a z-domain block diagram of a direct form II notch filter structure.

FIG. 1 illustrates the z-domain block diagram of a direct form II notch filter structure 102. The filter 102 receives signal X[n] and provides a filtered signal Y[n].

Figure 2:
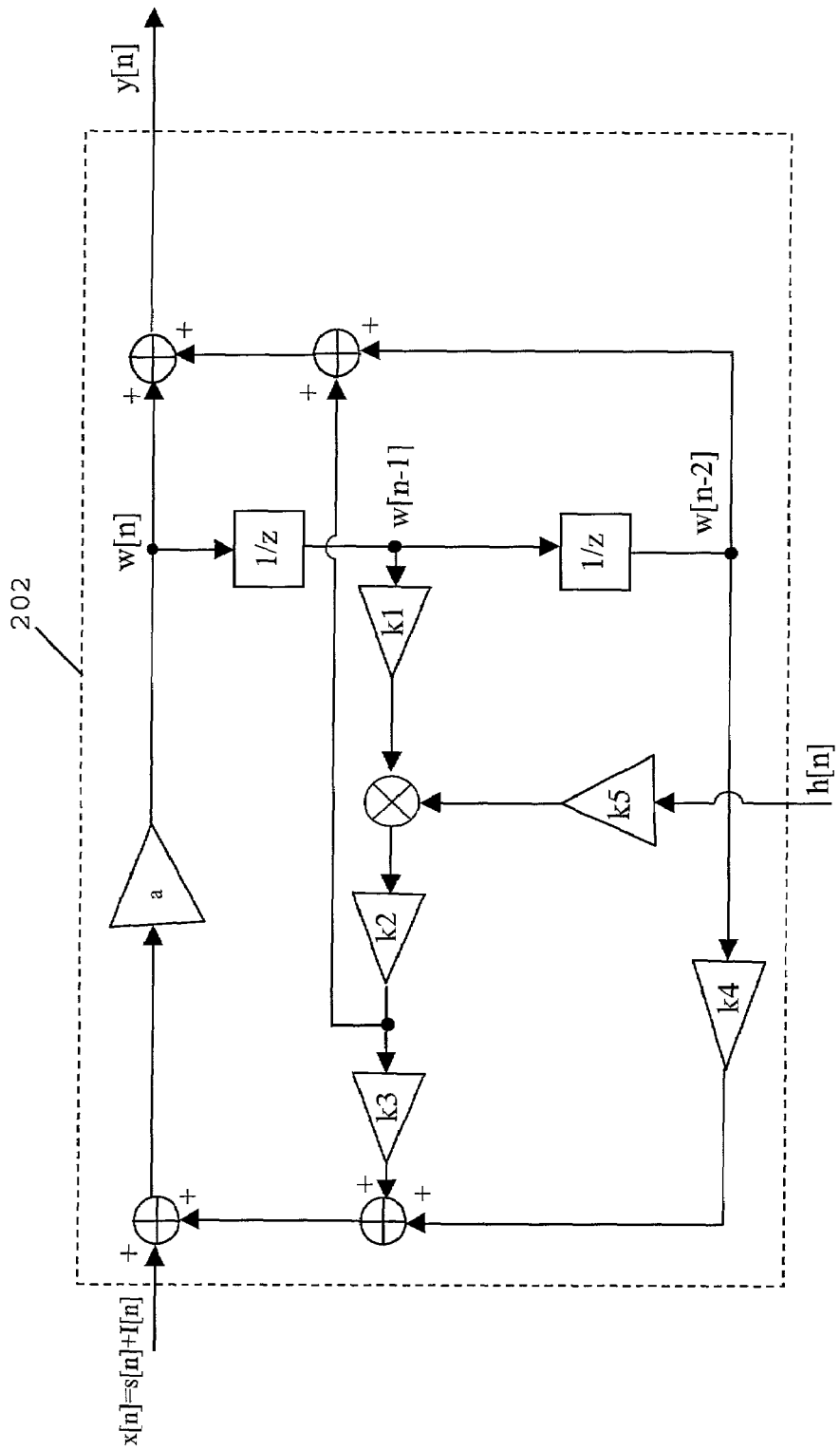
FIG. 2 is a z-domain block diagram illustrating one structure of an adaptive notch filter as may be employed in one embodiment of the invention.

FIG. 2 illustrates the z-domain block diagram of one specific embodiment of the adaptive notch filter of the invention. The filter 202 receives as inputs signals x[n] and h[n] and provides a filtered output signal y[n]. Signal x[n] includes an information or data signal s[n] and an interference signal I[n]. The null or center frequency of the filter 202 is turned by the adaptation signal or input parameter h[n] which itself is updated by an adaptive mechanism described below.

The filter transfer function is:

$$H(z) = a \frac{1 + k_1 k_2 h[n] k_5 z^{-1} + z^{-2}}{1 - ak_1 k_3 h[n] k_5 z^{-1} - ak_4 z^{-2}}$$

In order to provide the required stability without degrading the frequency response behavior of the notch filter 202, the coefficient "a" is introduced in the structure and is set to a value very close to unity. When implementing the system in integer arithmetic with finite word length, special care must be taken to reduce the dynamic range of the signals at various nodes of the filter. To do so, the parameters k1, k2, k3, k4, and k5 have been introduced in the system structure. These parameters serve as absorbing scaling factors to reduce the dynamic range of the signals at the various nodes. In one implementation, these parameters have values in the range of:

$$-1 \leq \frac{k_1}{2} k_2 k_5 h[n] \leq 1$$

$$0 << a < 1$$

$$0 < k_3, k_4 < 1$$

According to one embodiment, these parameters are set to integer power of $2^{-1}$ to simplify the notch filter implementation.

The value of h[n] is updated using gradient-based algorithms such as Recursive Prediction Error and Pseudolinear Regression algorithms. The signals w[n-1], w[n-2], and h[n] (shown in FIG. 2) are scaled down by appropriate factors so that when the system is implemented in integer arithmetic, the dynamic range associated with each node always remains within the desired range. This prevents the structure from overflow non-linearity effects. As mentioned earlier, according to one implementation, all the coefficients 'a', k1, k2, k3, k4, and k5 are designed in the form of integer power of two to enable a computationally simple hardware structure.

The null or center frequency of the notch filter is allowed to vary adaptively using gradient-based algorithms such as Recursive Prediction Error (RPE) and Pseudolinear Regression (PLR). The adaptation is based on the minimization of the error signal which is the output signal y[n] of the notch filter 202. Hence, no reference signal is required. Once convergence takes place, the null or centre frequency of the notch filter is placed at the frequency corresponding to the unwanted narrowband interfering signal thus effectively eliminating the interference I[n]. The IIR filter structure is specially parameterized so that it remains stable within the whole input frequency range. This stability is achieved by selecting the value of coefficient 'a' to be less than but close to unity. In conventional structures, the parameter 'a' is set equal to one (1) which makes the system prone to instability at frequencies very close to half the sampling frequency.

An advantage of the proposed structure is that no prior information regarding the frequency location of the interfering signal is required. That is, the adaptation signal h[n], which serves to configure or set the null frequency of the notch filter, is based on the output signal y[n].

Figure 3:
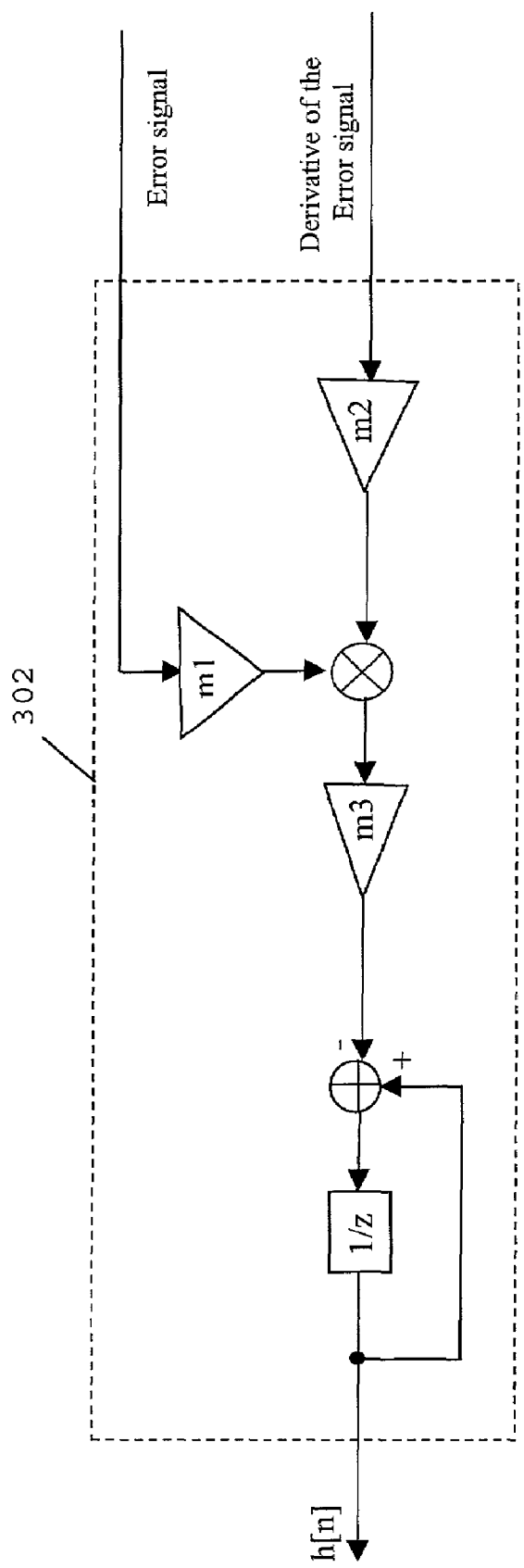
FIG. 3 is a system-level diagram illustrating the structure of an adaptive algorithm as may be employed in one embodiment of the invention.

FIG. 3 illustrates a block diagram of the structure 302 of an adaptive algorithm that may be employed in one embodiment of the invention. The adaptive algorithm is gradient based and its task is to minimize the power of the signal at the output of the notch filter. Once the minimization has been accomplished, the null frequency of the notch filter is found at the frequency of the narrowband signal.

The error surface associated with the system is proven to be unimodal produced that the desired wideband signal is corrupted with single narrowband interference. That is, the signal is corrupted by a single dominant interference narrowband. This means that the convergence of gradient-based algorithm is guaranteed and also the minimum of the error surface corresponds to the interfering frequency line with a negligible bias.

The error signal and its derivative with respect to h[n] are given by:

For RPE algorithm:

$$\frac{\partial e}{\partial h} = w[n-2]$$
$$e[n] = y[n-1];$$

For PLR algorithm:

$$\frac{\partial e}{\partial h} = x[n-2];$$
$$e[n] = y[n-1];$$

The signals are delayed by one extra sample to reduce the number of operations per cycle. The step size factor is absorbed inside the scaling coefficients m1, m2 and m3. In one implementation, these parameters are designed to be integer power of $2^{-1}$ to simplify the implementation further and to reduce the dynamic range of the signals at various nodes. The required frequency resolution, interference to signal ratio improvement factor depend on the word length of the adaptive coefficient h[n]. The bandwidth is controlled by the parameters k3 and k5. The proposed structure is able to place the null frequency of the notch filter within a frequency band ranging from 0.004 (normalized frequency) to half the sampling frequency.

It must be understood that the adaptive notch filter described herein is not limited to any particular communication protocol or scheme and may be implemented on both wired and wireless communication, transmission, and/or reception systems.

Moreover, the adaptive notch filter is not limited to any particular frequency or range of frequencies. The proposed structure shown in FIG. 2 is capable of removing single narrowband interference, however multiple filters embodying the adaptive filter describe herein may be configure in series to remove more than one interference signal.

As a person of ordinary skill in the art will recognize, a narrowband is merely narrow relative to the overall width of the communication channel employed. Thus, the width of narrowband interference need not be narrow in absolute terms but just in relative terms.

Additionally, various aspects of the invention are novel over the prior art. For instance, no prior information regarding the interfering frequency is required with the adaptive notch filter described. Moreover, the parametization described makes the structure highly stable with minimized dynamic range for signals at various filter nodes. Also no reference signal is necessary for the adaptive structure described, whereas conventional interference cancellers based on the finite impulse response (FIR) filter structure require a reference signal to be available for effective cancellation.

While certain exemplary embodiments have been described and shown in the accompanying drawings, it is to be understood that such embodiments are merely illustrative of and not restrictive on the broad invention. The invention is not limited to the specific constructions and arrangements shown and described since various other modifications may occur to those of ordinary skill in the art. Additionally, it is possible to implement the present invention or some of its features in hardware, programmable devices, firmwave, integrated circuits, software or a combination thereof where the software is provided in a processor readable storage medium such as a magnetic, optical, or semiconductor storage medium.

What is claimed is:
1. A signal filter device comprising:
an infinite impulse response (IIR) notch filter configured to receive a first input signal and provide an output signal; and a controller coupled to the notch filter to receive the output signal and provide a second input signal to the notch filter to adaptively control the null frequency of the notch filter, the second input signal being altered using a gradient-based algorithm modified so that a derivative of an error signal of the modified gradient-based algorithm is a delayed, filtered first input signal in order to minimize power of the output signal, the gradient-based algorithm is a modified, recursive prediction error algorithm.

2. The signal filter device of claim 1 wherein the IIR notch filter is a constrained IIR notch filter.

3. The signal filter device of claim 1 wherein the IIR notch filter is a second order IIR notch filter.

4. The signal filter device of claim 1 wherein the notch filter removes a particular frequency band from the first input signal and provides the remaining signal as the output signal.

5. The signal filter device of claim 4 wherein the first input signal is a wideband signal and the frequency band removed is a narrow frequency band.

6. The signal filter device of claim 4 wherein the frequency band removed corresponds to signal interference.

7. The signal filter device of claim 1 wherein the notch filter requires no external reference signal.

8. The signal filter device of claim 1 wherein the controller is configured to minimize the power of the output signal of the notch filter by controlling the null frequency of the notch filter.

9. The signal filter device of claim 8 wherein the controller minimizes the power of the output signal by modifying the second input signal according to the gradient-based algorithm.

10. The signal filter device of claim 9 wherein the second input signal is based on the output signal and the derivative of the output signal with respect to the second input signal.

11. The signal filter device of claim 1 wherein the received signal contains a dominant interference narrowband.

12. A signal filter device comprising:

an infinite impulse response (IIR) notch filter configured to receive a first input signal and provide an output signal; and a controller coupled to the notch filter to receive the output signal and provide a second input signal to the notch filter to adaptively control the null frequency of the notch filter, the second input signal being altered using a gradient-based algorithm modified so that a derivative of an error signal of the modified gradient-based algorithm is a delayed, filtered first input signal in order to minimize power of the output signal, the gradient-based algorithm is a modified, pseudolinear regression algorithm.

13. A signal filter device comprising:

an infinite impulse response (IIR) notch filter configured to receive a first input signal and provide an output signal, the notch filter including a z-domain transfer function $$H(z) = a \frac{1 + k_1 k_2 h[n] k_5 z^{-1} + z^{-2}}{1 - a k_1 k_2 k_3 h[n] k_5 z^{-1} - a k_4 z^{-2}}$$

where the terms a, k1, k2, k3, k4, and k5 are filter parameters and absorbing scaling factors and h[n] is the second input signal; and a controller coupled to the notch filter to receive the output signal and provide a second input signal to the notch filter to adaptively control the null frequency of the notch filter.

14. A communication device comprising:

a receiving module including, an infinite impulse response (IIR) notch filter configured to receive a first input signal and provide an output signal; and a controller coupled to the notch filter to receive the output signal and provide a second input signal to the notch filter to adaptively control the null frequency of the notch filter, the controller being configured to minimize the power of the output signal of the notch filter and to minimize the power of the output signal by varying the second input signal according to a gradient-based algorithm modified so that a derivative of an error signal of the modified gradient-based algorithm is a delayed, filtered first input signal in order to minimize power of the output signal, the gradient-based algorithm is a modified, pseudolinear regression algorithm.

15. The communication device of claim 14 wherein the IIR notch filter is a constrained IIR notch filter.

16. The communication device of claim 14 wherein the IIR notch filter is a second order IIR notch filter.

17. The communication device of claim 14 wherein the first input signal is a wideband signal.

18. The communication device of claim 14 wherein the notch filter removes a particular frequency band from the first input signal and provides the remaining signal as the output signal.

19. The communication device of claim 18 wherein the frequency band removed corresponds to narrowband signal interference.

20. The communication device of claim 18 wherein the received signal contains a dominant interference narrowband.

21. The communication device of claim 14 wherein minimizing the power of the output signal of the notch filter causes narrowband interference to be removed from the first input signal.

22. A communication device comprising:

a receiving module including, an infinite impulse response (IIR) notch filter configured to receive a first input signal and provide an output signal; and a controller coupled to the notch filter to receive the output signal and provide a second input signal to the notch filter to adaptively control the null frequency of the notch filter, the controller being configured to minimize the power of the output signal of the notch filter and to minimize the power of the output signal by varying the second input signal according to a gradient-based algorithm modified so that a derivative of an error signal of the modified gradient-based algorithm is a delayed, filtered first input signal in order to minimize power of the output signal, the modified gradient-based algorithm is a modified, recursive prediction error algorithm.

23. The communication device of claim 22 wherein the second input signal is based on the output signal and the derivative of the output signal with respect to the second input signal.

24. A communication device comprising:
   a receiving module including;
      an infinite impulse response (IIR) notch filter configured to receive a first input signal and provide an output signal, the notch filter has the z-domain transfer function $$H(z) = a\frac{1 + k_1 k_2 h[n] k_5 z^{-1} + z^{-2}}{1 - a k_1 k_2 k_3 h[n] k_5 z^{-1} - a k_4 z^{-2}}$$

where the terms a, k1, k2, k3, k4, and k5 are the filter parameters and absorbing scaling factors and h[n] is the second input signal; and
   a controller coupled to the notch filter to receive the output signal and provide a second input signal to the notch filter to adaptively control the null frequency of the notch filter.

25. A method for filtering signal interference comprising:
   filtering by a notch filter a received signal to remove interference and provide an output signal, the notch filter including a z-domain transfer function $$H(z) = a\frac{1 + k_1 k_2 h[n] k_5 z^{-1} + z^{-2}}{1 - a k_1 k_2 k_3 h[n] k_5 z^{-1} - a k_4 z^{-2}}$$

where the terms a, k1, k2, k3, k4, and k5 are the filter parameters and absorbing scaling factors and h[n] is an adaptation input signal for the notch filter; and
   dynamically minimizing the power of the output signal by removing a frequency band.

26. The method of claim 25 wherein minimizing the power of the output signal by removing a frequency band from the received signal is accomplished by modifying the null frequency of the notch filter to correspond with the highest power frequency band in the received signal.

27. The method of claim 25 wherein the filtering is accomplished by a constrained IIR notch filter.

28. The method of claim 25 wherein the filtering is accomplished by a second order IIR notch filter.

29. The method of claim 25 wherein the received signal is a wideband signal and the removed frequency band is a narrow frequency band.

30. The method of claim 25 wherein the removed frequency band corresponds to signal interference.

31. The method of claim 25 wherein the received signal contains a dominant interference narrowband.

32. The method of claim 25 wherein minimization of the output signal power results from the detection of the output signal power.

33. The method of claim 25 wherein the minimization of the power of the output signal is accomplished according to a gradient-based algorithm.

34. The method of claim 33 wherein the gradient-based algorithm is a modified, recursive prediction error algorithm.

35. The method of claim 33 wherein the gradient-based algorithm is a modified, pseudolinear regression algorithm.

36. A machine-readable medium having one or more instructions for adaptively filtering signal interference, which when executed by a processor, causes the processor to perform operations comprising:
   receiving a first signal;
   filtering the first signal to remove interference and provide an output signal, the filtering is accomplished by a notch filter including a z-domain transfer function $$H(z) = a\frac{1 + k_1 k_2 h[n] k_5 z^{-1} + z^{-2}}{1 - a k_1 k_2 k_3 h[n] k_5 z^{-1} - a k_4 z^{-2}}$$

where the terms a, k1, k2, k3, k4, and k5 are the filter parameters and absorbing scaling factors and h[n] is a second adaptation input signal for the notch filter, and minimizing the power of the output signal by removing a frequency band from the first signal.

37. The machine-readable medium of claim 36 wherein the minimizing the power of the output signal by removing a frequency band from the first signal is accomplished by modifying the null frequency of the notch filter to correspond with the highest power frequency band in the first signal.

38. The machine-readable medium of claim 36 wherein the filtering is accomplished by a constrained infinite impulse response notch filter.

39. The machine-readable medium of claim 36 wherein the filtering is accomplished by a second order infinite impulse response notch filter.

40. The machine-readable medium of claim 36 wherein the first signal is a wideband signal and the removed frequency band is a narrow frequency band.

41. The machine-readable medium of claim 36 wherein the removed frequency band corresponds to signal interference.

42. The machine-readable medium of claim 36 wherein the first signal contains a dominant interference narrowband.

43. The machine-readable medium of claim 36 wherein minimization of the output signal power is based on the detection of the output signal power.

44. The machine-readable medium of claim 36 wherein the minimization of the power of the output signal is accomplished according to a gradient-based algorithm.

45. The machine-readable medium of claim 44 wherein the gradient-based algorithm is a modified, recursive prediction error algorithm.

46. The machine-readable medium of claim 44 wherein the gradient-based algorithm is a modified, pseudolinear regression algorithm.

47. A system for adaptively filtering signal interference comprising:
   means for filtering a first signal to remove interference and provide a second signal, the means for filtering includes a notch filter including a z-domain transfer function $$H(z) = a\frac{1 + k_1 k_2 h[n] k_5 z^{-1} + z^{-2}}{1 - a k_1 k_2 k_3 h[n] k_5 z^{-1} - a k_4 z^{-2}}$$

where the terms a, k1, k2, k3, k4, and k5 are the filter parameters and absorbing scaling factors and h[n] is an adaptation input signal for the notch filter; and
   means for minimizing the power of the second signal by removing a frequency band from the first signal.

48. The system of claim 47 wherein the means for minimizing the power of the second signal by removing a frequency band from the first signal is accomplished by modifying the null frequency of the notch filter to correspond with the highest power frequency band in the first signal.

49. The system of claim 47 wherein the means for filtering includes a constrained infinite impulse response notch filter.

50. The system of claim 47 wherein the means for filtering includes a second order infinite impulse response notch filter.

51. The system of claim 47 wherein the first signal is a wideband signal and the removed frequency band is a narrow frequency band.

52. The system of claim 47 wherein the removed frequency band corresponds to signal interference.

53. The system of claim 47 wherein minimization of the second signal power results from the detection of the output signal power.

54. The system of claim 47 wherein the minimization of the power of the second signal is accomplished according to a gradient-based algorithm.

55. The system of claim 54 wherein the gradient-based algorithm is a modified, recursive prediction error algorithm.

56. The system of claim 54 wherein the gradient-based algorithm is a modified, pseudolinear regression algorithm.

* * * * *